US012472103B2

(12) United States Patent
Cartagena

(10) Patent No.: US 12,472,103 B2
(45) Date of Patent: Nov. 18, 2025

(54) NANO-EMULSIFIED CANNABINOID OR OILS IN ATHLETIC TAPE AND OTHER PRODUCTS

(71) Applicant: BOCANNAVEDA, LLC, Philadelphia, PA (US)

(72) Inventor: Anna Khara Cartagena, Philadelphia, PA (US)

(73) Assignee: BOCANNAVEDA, LLC, Philadelphia, PA (US)

( * ) Notice: Subject to any disclaimer, the term of this patent is extended or adjusted under 35 U.S.C. 154(b) by 1 day.

(21) Appl. No.: 16/691,165

(22) Filed: Nov. 21, 2019

(65) Prior Publication Data

US 2020/0155360 A1 May 21, 2020

Related U.S. Application Data

(60) Provisional application No. 62/938,664, filed on Nov. 21, 2019, provisional application No. 62/840,014, filed on Apr. 29, 2019, provisional application No. 62/793,685, filed on Jan. 17, 2019, provisional application No. 62/770,354, filed on Nov. 21, 2018.

(51) Int. Cl.

| | |
|---|---|
| ***A61F 13/0246*** | (2024.01) |
| ***A61K 9/107*** | (2006.01) |
| ***A61K 9/70*** | (2006.01) |
| ***A61K 31/05*** | (2006.01) |
| ***A61K 31/352*** | (2006.01) |

(52) U.S. Cl.

CPC ........ *A61F 13/0253* (2013.01); *A61K 9/7076* (2013.01); *A61K 31/05* (2013.01); *A61K 31/352* (2013.01); *A61K 9/1075* (2013.01)

(58) Field of Classification Search

None

See application file for complete search history.

(56) References Cited

U.S. PATENT DOCUMENTS

| | | | | |
|---|---|---|---|---|
| 6,113,940 | A | 9/2000 | Brooke et al. | |
| 10,251,837 | B2 | 4/2019 | Huang | |
| 2006/0034798 | A1 | 2/2006 | Mosbey et al. | |
| 2012/0064136 | A1 | 3/2012 | Baker, Jr. et al. | |
| 2013/0060209 | A1 | 3/2013 | Tyler et al. | |
| 2013/0276799 | A1 | 10/2013 | Davidson et al. | |
| 2016/0158179 | A1 | 6/2016 | Baker, Jr. et al. | |
| 2017/0143627 | A1 | 5/2017 | Misra | |
| 2017/0312210 | A1 | 11/2017 | Edelson et al. | |
| 2018/0071380 | A1 | 3/2018 | Makidon et al. | |
| 2018/0078512 | A1 | 3/2018 | Weimann | |
| 2018/0221333 | A1* | 8/2018 | Dollard | A61K 36/068 |
| 2018/0360739 | A1 | 12/2018 | Lorenz et al. | |
| 2018/0360757 | A1* | 12/2018 | Doroudian | A61K 47/20 |
| 2019/0110981 | A1* | 4/2019 | Weimann | A61K 9/006 |
| 2019/0133944 | A1 | 5/2019 | Smith et al. | |

FOREIGN PATENT DOCUMENTS

| | | | | |
|---|---|---|---|---|
| EP | 1186298 A2 | 3/2002 | | |
| EP | 2995302 A1 | 3/2016 | | |
| WO | WO-2007055176 A1 * | 5/2007 | | A61K 9/7069 |
| WO | 2016006996 A1 | 1/2016 | | |
| WO | 2016/144376 A1 | 9/2016 | | |
| WO | 2019025880 A1 | 2/2019 | | |

OTHER PUBLICATIONS

English Translation from Google Patents of WO 2007055176 A1 (13 pages) (Year: 2007).*

International Search Report and Written Opinion of the International Searching Authority issued Mar. 12, 2020 for PCT International Application No. PCT/US2019/062649.

Hemp Infused Tattoo Ink / S8 Tattoo Website https://s8tattoo.com/products/s8-hemp-infused-ink Printed Nov. 21, 2019 (2 pgs).

What is CBD Isolate? Website: https://isodiol.com/isodiol-news/cbd-isolate/ Printed Nov. 21, 2019, (3 pgs).

CBD Strips: Everything You Need To Know the Newest Medical Marvel Website: https://honestmarijuana.com/cbd-strips-everything-need-know/?age-verified=48bca0c5ae Printed Nov. 21, 2019 (7 pgs).

Chinese Office Action dated Feb. 23, 2022 for Chinese Patent Application No. 201980085061.3.

* cited by examiner

*Primary Examiner* — Aradhana Sasan
(74) *Attorney, Agent, or Firm* — Volpe Koenig

(57) ABSTRACT

A nanoemulsion tape includes an adhesion layer including a nanoemulsion and at least one non-adhesion layer. The nanoemulsion includes at least one oil, at least one oil base surfactant, at least one water base surfactant, water, and either an isolate or distillate. The isolate and the distillate include at least one of a CBD, a THC and a cannabinoid based oil. The nanoemulsion tape may further include a co-surfactant within the nanoemulsion. Further, a method for making the nanoemulsion tape and a method of using the nanoemulsion tape are disclosed.

11 Claims, 3 Drawing Sheets

NANO-EMULSIFIED CANNABINOID OR OILS IN ATHLETIC TAPE AND OTHER PRODUCTS

CROSS REFERENCE TO RELATED APPLICATIONS

This application claims the benefit of U.S. 62/770,354 filed on Nov. 21, 2018, U.S. 62/793,685 filed on Jan. 17, 2019 U.S. 62/840,014 filed on Apr. 29, 2019 and 62/938,664 filed on Nov. 21, 2019, which are incorporated by reference as if fully set forth.

FIELD OF INVENTION

The present invention relates to the process of nanoemulsification and dried nanoemulsions of a variety of different compounds in order to add the nanoemulsified compound to a variety of different products such as athletic tape.

BACKGROUND

Cannabis contains more than 460 compounds including the class, cannabinoids. Over 100 different cannabinoids have been isolated from cannabis. The human body contains two known cannabinoid receptors, Cannabinoid Receptor 1 (CB1) and Cannabinoid Receptor 2 (CB2). Cannabinoids have many therapeutic effects on humans including anti-inflammatory, neuroprotective, antispastic, analgesic and antiemetic.

Cannabinoids are nearly insoluble in water; however they are soluble in lipids and alcohols. Due to their poor water solubility, cannabinoids have a compromised bioavailability and a delayed therapeutic action when received via a topical or oral administration.

SUMMARY

According to an embodiment of the present invention is a process for creating a cannabinoid nanoemulsion. The cannabinoid is dissolved in at least one solubilizing carrier oil to create an oil phase and water and one or more surfactants are combined with the oil phase. This mixture is subjected to a very intense high shear homogenization process which is achieved through the use of rotor stator mixers, high pressure homogenizers and/or high frequency ultra sound. The resulting nanoemulsion is then combined with the adhesion layer of an athletic tape.

According to the embodiments, the nanoemulsion allows for enhanced skin permeation that creates fast and complete absorption by the body. Further, unlike unprocessed cannabinoids or other water insoluble compounds, the claimed nanoemulsion is water compatible and may be easily mixed into water and other beverages. Additionally, due to the process of creating the nanoemulsion, and its resulting particle size, the nanoemulsion may be introduced to the user either orally, transdermally, or through another means suitable for transferring the nanoemulsion into the body. Finally, the claimed nanoemulsion may offer user an all-natural, non-toxic option to pain relief in a multitude of different products.

DETAILED DESCRIPTION OF THE PREFERRED EMBODIMENTS

Figure 1:
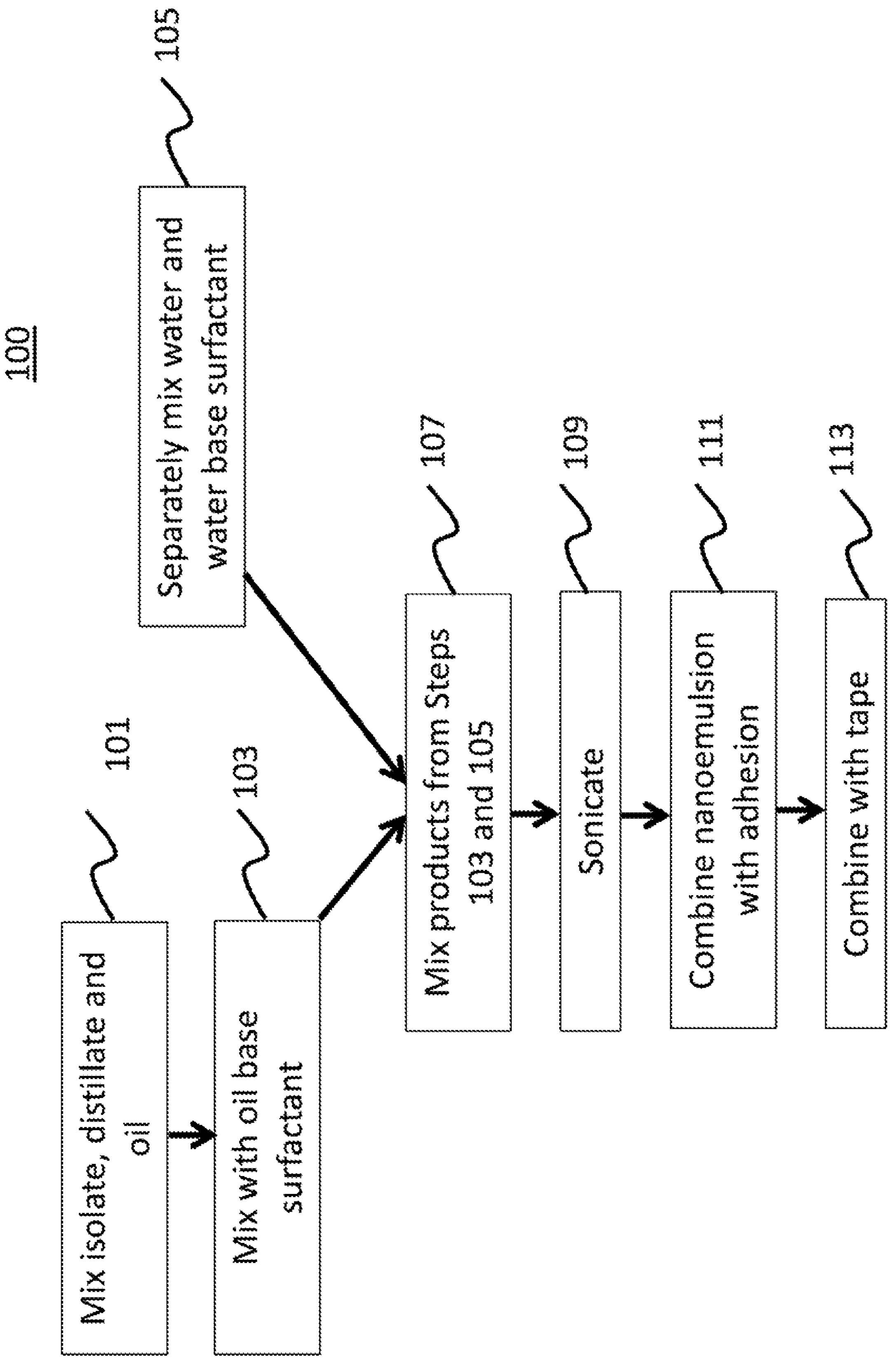
FIG. 1 is a flow chart of the process used to create the nanoemulsion tape.

One embodiment of an ideal nanoemulsion involves the use of a high hydrophilic-lipophilic balance (HLB) primary surfactant as an emulsifier such as a polysorbate or a polyglycerol coupled with a Low HLB value co-surfactant such as a phospholipid. Nanoemulsions contain lipid particles which are >200 nanometer in size and are comprised of a continuous aqueous phase and a dispersed oil phase. In one preferred embodiment of a cannabinoid nanoemulsion the aqueous phase comprises water and a high HLB value amphiphilic surfactant, with a dispersed oil phase, where the oil phase comprises at least one low HLB value amphiphilic surfactant such as a phospholipid and the desired cannabinoid(s) and at least one solubilizing lipid. Nanoemulsions are known to have certain advantageous properties, such as high interfacial surface area, and long-term kinetic stability.

Nanoemulsions may be included in a variety of products including but not limited to athletic or transdermal patches, cosmetics, creams and facial masks. Additionally, nanoemulsions may be included in oral products such as supplements, beverages, and beverage additives such as creamers and vitamin shots, proteins as well as edible products such as candies, gummies, fruit snacks, other snack foods and other processed foods. Further nanoemulsions have multiple pharmaceutical applications and are used in drug creations including intravenous applications such as vaccines. Nanoemulsions may also be added to animal chewable foods, treats, and snacks. The small size of a nanoemulsion, when added to oral products, frequently allows for greater amounts of the product to be absorbed directly into the bloodstream.

Nanoemulsions may also be included in hair products such as shampoos, conditioners, hair dyes and sprays for both humans and animals. Further, nanoemulsions may be added to body washes, soaps, fragrances and body mists. Further, nanoemulsions may be added not only to hair dyes, but skin dyes and inks of a permanent and semi-permanent nature, as well as tattoo care products or first aid products such as bandages, ointments, creams and sprays. Bandages may also include liquid bandages.

A nanoemulsion may be utilized in the traditional manner as a liquid but may also find applications as a freeze or spray-dried powder. This end product may be lighter in weight and may be more resistant to bio degradation allowing it to be applied to dry formulas such as whey proteins, instant coffees, or teas.

Nanoemulsions may be added to single use and reusable bandages. The small size of the nanoemulsion, when added to bandages, allows for greater amounts of the product to be absorbed into the body via a trans follicular pathway. Transdermal patches are commonly used and configured to deliver medicine to the wearer via the skin and bloodstream. A specific dose of medication may be added to an adhesive patch and placed on the skin and absorbed into the body. Transdermal patches are advantageous over other forms of drug delivery, such as oral, topical or intravenous, in that they may provide a controlled release of the medication. However, a known disadvantage of transdermal patches is that the skin is a barrier and the deliverable substance must have a unique shape and size to be able to pass through the skin and be absorbed by the body.

Another dermal skin patch that may be used in pain relief is athletic tape which may be also known as kinesiology tape, or kinesio tape. Athletic tapes are commonly used and configured to treat soft tissue injuries including strains, sprains, swollen muscles, contusions, tendon or ligament injuries or stress injuries. These and other soft tissue injuries may leave the person with pain, swelling, inflammation, stiffness, limited range of motion, and other negative side effects. The use of athletic tape may provide support and relief to such injuries by aiding in the healing process and reducing the risk of future injury. These tapes may be used while a soft-tissue injury is healing and the injured person continues to participate in activities that could aggravate the healing tissue. Further, these tapes are known to have the ability to increase lymphatic flow, which may also help heal soft-tissue injuries. Additionally, athletic tapes may be used to prevent an initial injury altogether.

While the disclosure relates to all athletic or body tapes, one specific athletic tape disclosed may be kinesiology tape. Kinesiology tape is designed to lift or pull skin away from the muscles or underlying soft tissue. This separation allows for increased circulation of blood and lymphatic fluids. Additionally, the separation allows for decompression of inflamed pain receptors, which allows the user to feel relief from the injury.

The use of kinesiology tape, or kinesio tape, may be designed to provide the user with a variety of options for a wide range of injuries. Kinesiology tape may be placed in a range of locations and patterns on the body in order to address specific injuries or benefits the user is looking to achieve. Kinesiology tape may be designed to be extremely flexible and elastic which may allow the user to maintain their full range of motion. Kinesiology tapes may be left on the user from hours to days, and may be designed to repel water and sweat.

The kinesiology tape of the present disclosure may enable a topical drug treatment. In some embodiments, the tape may allow transdermal delivery of a drug via one or more surfaces of the tape. The drug may be a prescription or non-prescription drug that is useful in the treatment of soft tissue injuries. Specifically, in some examples the drug incorporated may be a cannabinoid including but not limited to tetrahydrocannabinol (THC), cannabidiol (CBD) or whole or broad spectrum cannabis oil. The cannabinoids may be adapted for topical administration to decrease pain, swelling, inflammation or other side effects of a soft tissue injury.

FIG. 1 demonstrates the process for achieving a CBD nanoemulsion tape, flowchart 100. First, as shown in step 101, either an isolate or a distillate is combined with an oil to create an oil mixture. The ingredients of step 101 are heated while being mixed. The isolate or the distillate may be CBD, a cannabis oil or THC. Additionally, any type of cannabinoid may be used. Different cannabinoids may be selected based on the effects desired to be achieved. The amount of cannabinoid selected is dependent on a multitude of factors. The cannabinoid concentration of the final mixture may range from 0.01% to 50%. The cannabinoid concentration is preferably 5% to 10%. More preferably 7.5% to 10%, with 7.5% being the most preferred amount. Various oils may be suitable solvents for mixing with the isolate or distillate. Preferably a food grade medium to long chain vegetable based carboxylic acid triglyceride would be the oil chosen.

In step 103 the oil mixture created in step 101 is mixed with an oil base surfactant to create an oil phase. Nanoemulsions may be stabilized by amphiphilic molecules called surfactants which prevent droplet aggregation and reduce interfacial tension. Common surfactants utilized in nanoemulsions are Tween 20, 40, 60 and 80 (Polyoxyethylene sorbitan monolaurate), Span 20, 40, 60 and 80 (Sorbitan monolaurate), Solutol HS-15 (polyoxyethylene-660-hydroxystearate), Dermofeel G-10L (Polyglyceryl-10 Laurate). Other common surfactants include sodium dodecyl sulfate, sodium laurel sulfate, poloxamers, polysaccharides (e.g., gums, starch derivatives), and PEG containing block copolymers. Amphiphilic fats like lecithin (phosphatidylcholine) and other phospholipids, as well as amphiphilic proteins like casein and whey protein (β-lactoglobulin) are commonly utilized as well. In addition to the list provided, co-surfactants are may also be used in strengthening the interfacial film. Commonly used co-surfactants may include propylene glycol, polyethylene glycol, ethanol, glycerin, and propanol. Applicant has found that not all surfactants provide the same effects when mixed with cannabinoids therefore it is advantageous that one of the above surfactants is used to create the nanoemulsion. For example, the use of certain oils with certain surfactants may lead to poor optimization of either the oil or surfactant. Thus, leading to a nanoemulsion which is less stable or not as water-compatible as the claimed nanoemulsion. When any nano-sized droplet may be achieved, it is preferred that the droplet size is in a range from 40 to 150 nm. More preferably the droplet size is in a range from 60 nm to 100 nm.

The oil phase may be up to 60% of the final mixture. More preferably the oil phase is between 3% and 60% of the final mixture. Most preferably the oil phase may be 50% of the final mixture. One oil or a selection of different oils may be chosen and combined to create the final oil amount. If multiple oils are selected they may each make up the same final amount of the formula. For instance, if three oils are selected they may each make up 3% of the final formula so that the final formula is 9% oil. However, if multiple oils are selected the oils may each be a different percentage of the final formula. For example oil 1 may be 5%, oil 2 is 7% and oil 3 is 3%. Thus, the total percentage of the oils would be 15% of the final formula. Further, the percentages of the ingredients used may either be whole numbers such as 5%, but may also be non-whole number such as 5.4%.

Next, in step 105, water and at least one water base surfactant are mixed together to create a water phase. The ingredients used in step 105 are mixed separately from the oil phase created in step 103. The amount of water added should make up between 0% and 97% of the total mixture. Then, in step 107, the water phase and the oil phase are mixed into a combined mixture.

In an exemplary embodiment, the oil phase and water phase from step 107 are sonicated to create the combined mixture. The exposure of the oil phase and water phase to high-intensity ultrasound generates acoustic cavitation. Acoustic cavitation produces violent asymmetrical imploding vacuum bubbles that form tiny droplets. The intensity of the acoustic cavitation is proportional to the displacement amplitude of the ultrasonic horn. However, the relationship between the ultrasonic amplitude and the droplets size is not linear. Multiple types of homogenizers may be used to create the pre-mix for the nanoemulsion. For example, a homogenizer, a high-pressure homogenizer or a high-pressure valve homogenizer or a sonicator system could be used.

In another exemplary embodiment, the oil phase and water phase from step 107 are homogenized to create the combined mixture. The oil phase and water phase are exposed to constant pressure. The pressure is selected based on multiple factors regarding the output nanoemulsion including but not limited to the particle size reduction, encapsulation and de-agglomeration. The selected pressure may be as low as 3.4 MPa/500 psi to 275 MPa/40,000 psi. The two phases may be passed through a number of different chambers. A chamber may be selected based on multiple factors including the type of emulsion, size, application and shear. The phases may be passed through the homogenizer once or multiple times. Additionally, the phases may be pre-heated, pre-cooled, or have no temperature change prior to the phases being passed through the homogenizer.

The combined mixture from step 107 is then sonicated, step 109. The exposure of the combined mixture to high-intensity ultrasound may generate acoustic cavitation. Acoustic cavitation produces violent asymmetrical imploding vacuum bubbles that form tiny droplets. The intensity of the acoustic cavitation is proportional to the displacement amplitude of the ultrasonic horn. However, the relationship between the ultrasonic amplitude and the droplets size is not linear.

Multiple types of spray driers may be used to create a nano-powder for the nanoemulsion. For example, a MOBILE MINOR, PRODUCTION MINOR, VERSATILE-SD, FSD, or FSD GRANULATOR system could be used. However, any system that could create the required nano-powder may be used. Further, multiple types of atomization may be implemented in the nanoemulsion process. For instance, a rotary atomizer, a two-fluid nozzle atomizer, a pressure nozzle atomizer or a COMBI-NOZZLE atomizer may be implemented. Preferably an atomization system which outputs a particle size of under 200 nm should be used and more preferably under 100 nm. More preferably the output particle size of 10 to 70 nm should be obtained. More preferably the output particle size of 20 to 50 nm should be obtained. However, any nozzle that could create the required nanoemulsion may be used.

Once the nanoemulsion is created, the nanoemulsion is combined with the adhesion of the tape to create a nanoemulsion adhesion, step 111. The nanoemulsion is substituted volumetrically so that a portion of the adhesion mixture's water content is removed. A specific mg/ml nanoemulsion is selected based on the type of nanoemulsion tape being made. A volumetric substitution may occur so that a percentage of the adhesion mixture's normal water content is removed and substituted with a specific weight of the nanoemulsion. This substitution allows for a percentage of the solids content of the nanoemulsion to be accounted for in the nanoemulsion adhesion layer of the nanoemulsion tape.

The solids content may include the surfactants, carrier oils, and cannabinoids mixed to make the nanoemulsion. Based on the substitution, the nanoemulsion adhesion would be heavier than a normal, non-nanoemulsion laden adhesive due to the increased solids content. However, the solids content of the nanoemulsion adhesion may range for 40% to 80%. Additionally, the water content may range between 20% and 60%. The increased solids content has no effect on the nanoemulsion adhesion's ability to bind to the contact surface. Additionally, while the increased solids content may increase the thickness of the nanoemulsion adhesion layer of the nanoemulsion tape, in a preferred embodiment, the thickness of the nanoemulsion adhesion is the same as the thickness in the non-nanoemulsion laden adhesion.

In an exemplary embodiment of step 111, the nanoemulsion is substituted volumetrically so that a portion of the adhesion mixture's water content is removed. In an exemplary embodiment, a 75 mg/ml nanoemulsion would be used. The volumetric substitution would occur so that 24.25% of the adhesion mixture's normal water content is removed and substituted with a specific weight of the 75 mg/ml nanoemulsion. In this exemplary embodiment, the specific weight of the 75 mg/ml nanoemulsion would be equivalent to 44.1% of the water content. This substitution may allow for 45% of the solids content of the nanoemulsion to be accounted for in the nanoemulsion adhesion layer.

The solids content may include the surfactants, carrier oils, and cannabinoids mixed to make the nanoemulsion. The above described exemplary embodiment nanoemulsion adhesion may be 7.67% heavier than a normal, non-nanoemulsion laden adhesive due to the increased solids content. However, the solids content of the nanoemulsion adhesion may range for 40 to 80%. Preferably, the solids content is 61%, but may be a non-whole number such as 61.3%. Additionally, the water content may range between 20 and 60%. Preferably, the water content is 39%, but may be a non-whole number such as 38.7%. The increased solids content has substantially no effect on the nanoemulsion adhesion's ability to bind to the contact surface. Additionally, while the increased solids content may increase the thickness of the adhesive layer, in a preferred embodiment, the thickness of the nanoemulsion adhesion is the same as the thickness in the non-nanoemulsion laden adhesive.

Preferably, the nanoemulsion would make up 5-30% of the nanoemulsion adhesion layer. More preferably, the nanoemulsion would be 10% of the nanoemulsion adhesion layer with the other 90% being the adhesion mixture itself. Any type of adhesion mixture may be used. Once the adhesion mixture and the nanoemulsion are mixed together they are placed on a strip and dried using heat so as to form the adhesive layer of the nanoemulsion tape, step 113. Preferably, since the product is to be used on skin, the adhesion would be strong enough to bind to skin, but not so powerful that it would harm the user during removal. One advantage of the nanoemulsion being combined with the adhesive is that the tape remains smooth and close the skin. Unlike other tapes that are used for drug delivery systems, the present invention may not be bulky, and may easily be worn under tight-fitting athletic clothes and may be less noticeable.

The nanoemulsion tape created in flowchart 100 may be any type of tape for use on both humans and animals. In a preferred embodiment, the nanoemulsion tape may be one of a bandage, an athletic tape, a kinesiology tape, a kinesio tape, or an elastic tape. Further, it is preferred that the nanoemulsion tape is stretchable.

Figure 2:
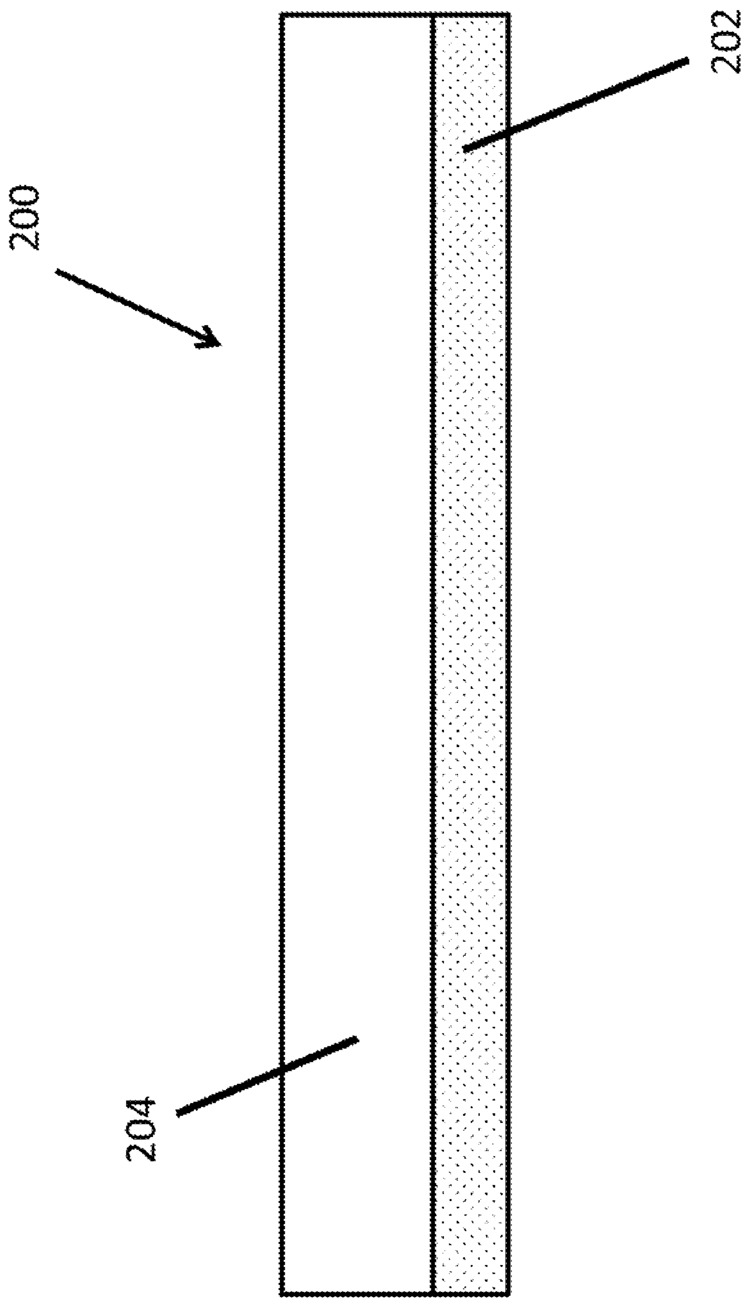
FIG. 2 is an exemplary embodiment of a nanoemulsion tape.

FIG. 2 depicts an exemplary version of the nanoemulsion tape 200. The nanoemulsion adhesion layer 202 is shown under the top layer 204 of the nanoemulsion tape. The nanoemulsion adhesion layer 202 is made according to flow chart 100 and includes the nanoemulsion. The user may apply the nanoemulsion tape 200 to the injured area of the body which allows for transdermal absorption of the nanoemulsion into the bloodstream for therapeutic purposes.

The small size of the nanoemulsion, when added to oral products, such as dissolvable strips, may allow for greater amounts of the product to be absorbed into the blood stream. Additionally, unlike a chewable or swallowable product, the above nanoemulsion avoids being broken down by the liver before being absorbed into the blood stream. This may allow five to ten times the amount of CBD to be absorbed by the body than through traditional, non-nanosized, methods.

Figure 3:
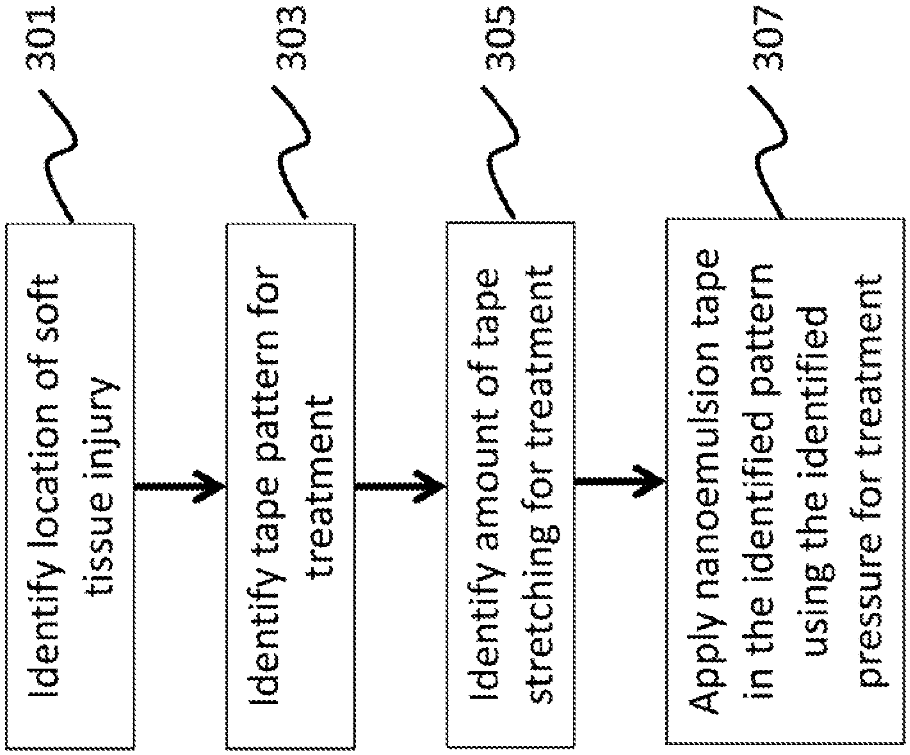
FIG. 3 is a flow chart of the method for using the nanoemulsion tape.

FIG. 3, shows a flow chart of the method of using the nanoemulsion tape created in FIG. 1. First, in step 301 a soft tissue injury site is identified. This area may be identified by the user, a doctor, a physical therapist or the person applying the nanoemulsion tape. Once the area is identified, the tape pattern is determined. step 303. Multiple types of patterns may be used depending on both the area identified in step 301 and the type of injury. Depending on the pattern, the size and number of nanoemulsion tape strips may vary. For example, in step 303, the nanoemulsion tape may be placed in a straight line, an x-pattern, or a y-pattern. Further, any pattern may be identified and implemented, and the pattern may create curved shapes such as u-shapes and tear-drop shapes.

Next, in step 305, the amount of stretching to apply to the nanoemulsion tape when applying is identified. Since the tape is elastic in nature, the nanoemulsion is stretched when it is applied to the skin which may help to alleviate the soft tissue injury. Based on the injury and the location, the nanoemulsion tape may be stretched a lot to cause the skin to pull away from the muscle, or in the case for example of swelling, the nanoemulsion tape may be not at all stretched. Finally, in step 307, the nanoemulsion tape is applied to the skin using the identified pattern and stretching the nanoemulsion tape the correct amount.

The use of the nanoemulsion tape may help to heal and prevent injuries. Nanoemulsion tapes may be used while a soft-tissue injury is healing and the injured person continues to participate in activities that could aggravate the healing tissue. Additionally, nanoemulsion tapes have the ability to increase lymphatic flow, which may also help heal soft-tissue injuries. Further, by providing a nanoemulsion to the adhesion layer of the nanoemulsion tape, transdermal delivery of a drug via one or more surfaces may be achieved. Additionally, the use of a cannabinoid including but not limited to tetrahydrocannabinol (THC), cannabidiol (CBD) or whole or broad spectrum cannabis oil in the nanoemulsion of the nanoemulsion tape may decrease pain, swelling, inflammation or other side effects of a soft tissue injury. Unlike other tapes that are used for drug delivery systems, the present invention may not be bulky, and may easily be worn under tight-fitting athletic clothes and may be less noticeable.

The invention claimed is:

1. A nanoemulsion tape comprising:
an adhesion layer containing water;
a nanoemulsion within the adhesion layer; and
at least one non-adhesion layer,
wherein the nanoemulsion includes at least one oil, at least one oil base surfactant, at least one water base surfactant, water, and either an isolate or distillate,
wherein the isolate and the distillate includes a cannabinoid including at least one of a cannabidiol (CBD), a tetrahydrocannabinol (THC) or a cannabinoid based oil,
wherein the adhesion layer contains a nanoemulsion adhesion matrix in which a portion of water content of an adhesive formulation of the adhesion layer is volumetrically substituted with the nanoemulsion,
wherein a concentration of the cannabinoid is 5% to 10%,
wherein a solids content of the adhesion layer is between 40% and 80%, and
wherein a water content of the adhesion layer is between 20% and 60%.

2. The nanoemulsion tape according to claim 1, wherein the at least one oil base surfactant is at least one of polyoxyethylene sorbitan monolaurate, ployglyceryl-10 laurate, polysaccharides, and lecithin.

3. The nanoemulsion tape according to claim 1, wherein the nanoemulsion further comprises a co-surfactant.

4. The nanoemulsion tape according to claim 3, wherein the co-surfactant is at least one of ethanol and glycerin.

5. The nanoemulsion tape according to claim 1, wherein the nanoemulsion is 5% to 30% of the nanoemulsion adhesion matrix-layer.

6. The nanoemulsion tape according to claim 1, wherein the nanoemulsion is under 200 nm.

7. The nanoemulsion tape according to claim 1, wherein the nanoemulsion tape is at least one of a bandage, an athletic tape, a kinesiology tape and a kinesio tape.

8. A method of using the nanoemulsion tape of claim 1, including:
identifying a soft tissue injury location;
identifying a pattern to apply the nanoemulsion tape;
determining if the amount of stretch the nanoemulsion tape should undergo when applying to a user's skin
applying the nanoemulsion tape using the identified pattern and the determined amount of stretch;
wherein a first end of the nanoemulsion tape is stuck to the user's skin using the nanoemulsion adhesion to the soft tissue injury location,
wherein a second end of the nanoemulsion tape is stuck to the user's skin using the nanoemulsion adhesion to the soft tissue injury location in the identified pattern, and
wherein while the nanoemulsion tape is applied an area between the first end and the second end is stuck to the user's skin.

9. The nanoemulsion tape according to claim 5, wherein the nanoemulsion is 10% of the nanoemulsion adhesion matrix.

10. The nanoemulsion tape according to claim 6, wherein the nanoemulsion is between 50 nm and 100 nm.

11. The nanoemulsion tape according to claim 1, wherein the nanoemulsion tape is for skin.

* * * * *